United States Patent [19]
Ohkubo

[11] Patent Number: 4,713,984
[45] Date of Patent: Dec. 22, 1987

[54] DRIVE STAGE CONTROL MECHANISM FOR AUTOMATIC TRANSMISSION

[75] Inventor: Masahiro Ohkubo, Kadoma, Japan

[73] Assignee: Kabushiki Kaisha Daikin Seisakusho, Osaka, Japan

[21] Appl. No.: 881,297

[22] Filed: Jul. 2, 1986

[30] Foreign Application Priority Data

Jul. 8, 1985 [JP] Japan .................................. 60-150828

[51] Int. Cl.$^4$ ............................................. F16H 47/00
[52] U.S. Cl. ........................................ 74/732; 74/740;
74/752 C; 192/85 AA; 192/109 F
[58] Field of Search ................. 74/360, 867, 868, 331,
74/869, 731, 861, 732, 752 C, 740; 188/347,
348; 192/52, 109 F, 85 AA

[56] References Cited

U.S. PATENT DOCUMENTS

| | | | |
|---|---|---|---|
| 3,126,752 | 3/1964 | Bolster | 74/359 |
| 3,282,385 | 11/1966 | Snyder | 192/109 F |
| 3,378,111 | 4/1968 | Greer et al. | 192/109 F |
| 3,633,439 | 1/1972 | Annis | 74/869 X |
| 3,650,364 | 3/1972 | Laing | 192/85 AA |
| 4,144,955 | 3/1979 | Garnier | 192/109 F |

FOREIGN PATENT DOCUMENTS 39-5562 12/1964 Japan .

Primary Examiner—George H. Krizmanich
Attorney, Agent, or Firm—Armstrong, Nikaido, Marmelstein & Kubovcik

[57] ABSTRACT

In an automatic transmission having a four-element two-stage torque converter and a planetary gear transmission which carries out a change-over operation of drive stage of plural planetary gear elements by hydraulically engaging and disengaging plural friction elements from the rear stage of the torque converter transmitting engine power by means of fluid; a drive stage control mechanism for automatic transmission, in which a piston carrying out the engagement and disengagement of the friction members by means of hydraulic force. The pressure surface of the piston is formed into plural concentric stepped surfaces. A pressure oil passage port interconnecting with a control valve for controlling charge and discharge of hydraulic pressure is provided at any one stage of the plural stepped surfaces. A passage leading the hydraulic pressure from such any one stage to another stage and having a throttling function is provided. An elastic member effecting a pressure force on a friction element when engaging the friction element is provided between the piston and the friction element.

4 Claims, 7 Drawing Figures

DRIVE STAGE CONTROL MECHANISM FOR AUTOMATIC TRANSMISSION

BACKGROUND OF THE INVENTION

Industrial Useful Field

This invention relates to an improvement of a drive stage control mechanism for automatic transmission.

Prior Art and Its Problem

An automatic transmission, which is mounted on such a vehicle and composed of a torque converter and a planetary gear transmission having plural drive stages, is generally designed to be changed its drive stage by engaging or disengaging components of the planetary gear transmission to or from an input shaft or a housing.

These engagement and disengagement of the components of planetary gear transmission become evident as a feeling at the time of changing speed. If gear components for first speed are disengaged before gear components for second speed are engaged when shifting the drive stage from first speed to second speed, for example, an engine power will be subjected to no load condition to cause a sudden rise of engine rotation.

On the other hand, if the gear components for first speed which are to be disengaged are kept at engaged condition even after the gear components for second speed have been engaged, for example, input and output shafts will be braked so as to produce a loss in efficiency and give uncomfortable feeling to passengers due to instantaneous deceleration.

Further, in case of sudden engagement or disengagement of gear components, they will become evident as a so-called speed-change shock to give uncomfortable feeling to passengers.

As described above, a timing of engagement or disengagement of the gear components is an important factor for deciding the feeling of transmission. Therefore, in order to improve this feeling, such construction has conventionally been employed that a one-way clutch is interposed between an output shaft of converter and a planetary gear transmission utilizing a reversing of force applied on the gear components before and after changing speed, or that an accumulator or an orifice is installed in a hydraulic control circuit for controlling the engagement and disengagement of gear components and is controlled by a timing valve.

In case of the former construction using the one-way clutch, however, sudden engagement will occur and induce the speed-change shock to cause an increase in cost uselessly at the time of shift-down, especially at the time of so-called kick-down.

Further, in case of the latter construction for hydraulic control wherein a load applied on a friction material is to be adjusted only by a hydraulic pressure actuating on a piston, an accurate control becomes impossible due to an influence of masses of the piston and the friction material and its mechanism becomes complicated to cause an increase in manufacturing cost.

There are prior arts (U.S. Pat. No. 3,126,752 and Japan Pat. No. 39-5562) in which a coned disc spring pressing on the friction material is provided and a two-stage piston is adapted to press the friction material, however, the both prior arts are designed to control only engagement of gear components so that both the engagement and disengagement of components can not be controlled.

OBJECT OF THE INVENTION

This invention is intended to improve a feeling of speed-change for both shift-up and shift-down by only modifying a construction of a friction element of gear components in order to solve the above disadvantages of the prior arts.

An object of the invention is to shorten a time required from a moment of a hydraulic valve changing over to a moment of the friction material commencing the engagement.

Another object of the invention is to increase a press-on force of the friction material with a lapse of time after the commencement of engagement of gear components.

A further another object of the present invention is to provide a drive stage control mechanism for automatic transmission which can apply a constant load on the friction material and can lessen the load with a lapse of time even when the hydraulic valve changes over to discharge a hydraulic pressure.

COMPOSITION OF THE INVENTION (1) Technical measure

In an automatic transmission providing a planetary gear transmission which carries out a change-over operation of drive stage of plural planetary gear elements by properly and hydraulically engaging or disengaging plural friction elements in a friction brake or friction clutch with or from a rear stage of a torque converter transmitting an engine power by means of fluid; a drive stage control mechanism for automatic transmission, in which a piston carrying out the engagement or disengagement of said friction brake or friction clutch by means of hydraulic force is provided, a pressed surface of this piston is formed into plural concentric stepped surfaces, a pressure oil passage port interconnecting with a control valve controlling charge and discharge of hydraulic pressure is provided at any one stage of said plural stepped surfaces, a passage leading the hydraulic pressure from this any one stage to another stage and having a throttling function is provided, and an elastic member effecting a pressure force on a friction element when engaging the friction element is provided between said piston and the friction element.

(2) Function

The first object of the invention, i.e. the shortening of time from the changing-over of the hydraulic valve to the commencement of engagement of the friction material, can be accomplished as follows. The piston is formed into the plural stepped stages and the pressure oil from the control valve is supplied only to any one stage, while other stages are supplied with pressure oil from the first stage of piston through the passage having the throttling function; so that the piston can start its stroke only by a pressure oil supply which is a little larger than a change in volume of first stage of piston. Thus, the time until the friction element commences its engagement can be shortened as compared with an ordinary one-stage piston.

Further, the another object of the invention, i.e. the improvement in the load increase characteristic from the commencement to the completion of engagement of the friction material, can be accomplished as follows. A piston inertia force at the moment of commencing the engagement and an excessive hydraulic pressure for making the piston slide are absorbed by the coned disc spring serving as the elastic member. On the other hand, a pressing load of the friction material at the time of commencing the engagement is a hydraulic pressure acting on the first-stage piston pressed face, which is only a little load. Therefore, when the pressure oil is supplied to another stage through the passage having the throttling function, the hydraulic pressure also acts on a pressed part of the subject stage to increase the entire piston load applied on the friction member. Thereby, the coned disc spring serving as the elastic member further increases its deflexion to cause the piston slide.

As mentioned above, the pressure oil is supplied slowly through the passage having the throttling function to the piston pressed part to be balanced with the load of the coned disc spring serving as the elastic member, thus the load applied on the friction material increasing slowly.

Moreover, the further another object of the present invention, i.e. the improvement in the load decreasing characteristic from the commencement to the completion of disengagement of the friction material, can be accomplished as follows. The hydraulic force pressing the first-stage piston pressed part becomes zero at the moment when the pressure oil acting on the piston is discharged by the control valve, so that the load of the friction material decreases abruptly to the value at the time of close contacting of the coned disc spring serving as the elastic member.

Since working oil accumulated in the other stages of piston is discharged thereafter through the passage having throttling function, a flow resistance is produced to control a speed by which the coned disc spring serving as the elastic member returns to its free condition. Thus, the friction material is slowly decreased its load while receiving the load from the coned disc spring.

As described above, since the timing of engaging and disengaging the friction material can be set easily by only using such simple construction as forming the piston into the multi-stage shape and installing the elastic member, the feeling when changing speed can be improved for both the shift-up and shift-down operations.

DETAILED DESCRIPTION OF THE INVENTION

Embodiment

Figure 1:
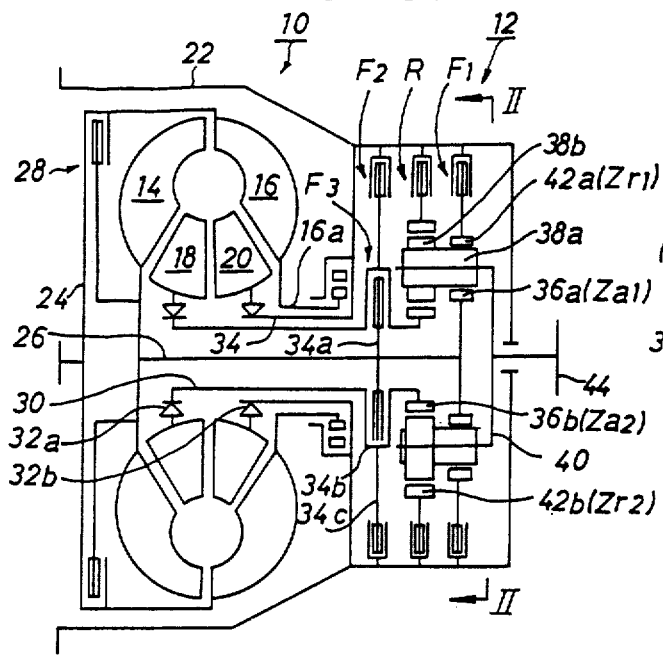
FIG. 1 is a structural schematic view showing an automatic torque converter for a truck according to this invention.

An automatic transmission for truck according to the present invention is shown in FIG. 1. In FIG. 1, 10 is a four-element two-stage torque converter, and a transmission 12 with forward three-speed and backward one-speed is coupled to a rear stage of the torque converter 10. The transmission 12 has a planetary gear train consisting of a first planetary gear 38a and a second planetary gear 38b (both being planetary gear element), which share one planetary carrier 40 in common, and has a clutch F3 and friction brakes F1, F2 and R.

These brakes F1, F2 and R and the clutch F3, as described later in details, are designed to be engaged and disengaged by a hydraulically operated multi-stage piston and coned disc spring (elastic member) provided between the multi-stage piston and the brakes F1, F2 and R and the clutch F3. The automatic transmission is composed of the transmission 12 and the torque converter 10.

The torque converter 10 consists of a turbine 14, a pump 16, a first stator 18 and a second stator 20 etc. and is covered by a housing 22. The pump 16 is coupled to a flywheel 24 of an engine, and a power from the flywheel 24 is adapted to be inputted to the pump 16.

The turbine 14 is coupled to a turbine shaft 26, and a lock-up clutch 28 is provided between the flywheel 24 and the turbine 14.

The first stator 18 is installed at the turbine side between the turbine 14 and the pump 16, and the first stator 18 is so carried as to be rotated in both normal and reverse directions. The first stator 18 is coupled to a first stator shaft 30, and a one-way clutch 32a is interposed between the first stator 18 and the first stator shaft 30. The one-way clutch 32a is designed to transmit the power to the first stator shaft 30 only when the first stator 18 rotates in a direction opposite to the turbine 14, and to run idle when the first stator 18 rotates in the same direction therewith.

The second stator 20 is disposed at the pump side between the turbine 14 and the pump 16, and the second stator 20 is coupled to the housing 22 through the second stator equipped with a one-way clutch 32b. The one-way clutch 32b also connects the second stator 20 with a second stator shaft 34 only when the second stator 20 rotates in the reverse direction.

The pump 16 is coupled to a pump shaft 16a, and the pump shaft 16a is carried by the housing freely rotatably.

The clutch F3 is composed of a clutch disc 34a and a clutch cover 34b is provided at a central part of the turbine shaft 26 and the first stator shaft 30. The clutch disc 34a is fastened to the turbine shaft 26, and the clutch cover 34b is formed integrally with the first stator shaft 30.

A disc 34c is fastened integrally to a radial outside of the clutch cover 34b, and the brake F2 is provided at an outer peripheral part of the disc 34c.

Operation and non-operation of these clutch F3 and brake F2, i.e. engagement and disengagement thereof, are effected at the time when a previously set rotation speed is reached on the basis of a rotation speed of an output shaft 44 for example, which can be detected easily by a well-known measure.

Figure 2:
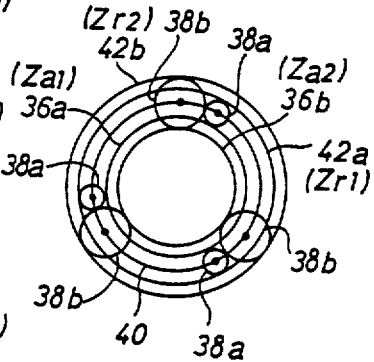
FIG. 2 is a sectional view taken on a line II—II of FIG. 1.

A first sun gear 36a is fixed to a transmission side end of the turbine shaft 26, and a tooth number of the first sun gear 36a is set to Za1. A first planetary gear 38a meshes with an outer periphery of the first sun gear 36a. The first planetary gear 38a is disposed at three circumferential places with equal distances interposed therebetween as shown in FIG. 2.

A second planetary gear 38b meshing with the first planetary gear 38a is disposed on the outer periphery of the first sun gear 36a at three places in the same manner as the first planetary gear 38a. The both planetary gears 38a and 38b are held by the planetary carrier 40 freely rotatably.

The second planetary gear 38b meshes with the second sun gear 36b fixed at the transmission side end of the first stator shaft 26, as shown in FIG. 1. A tooth number of the second sun gear 36b is Za2.

A first ring gear 42a (tooth number: Zr1) meshes with an outer periphery of the first planetary gear 38a, and a second ring gear 42b (tooth number: Zr2) meshes with an outer periphery of the second planetary gear 38b. Further, the brake F1 is provided on a radial outer periphery of the first ring gear 42a, and the brake F1 is fastened to the housing 22. The brake R is provided on an outer periphery of the second planetary gear 38b, and the brake R is fastened to the housing 22.

Said planetary carrier 40 is carried by the housing 22 freely rotatably and connected to the output shaft 44.

Figure 2A:
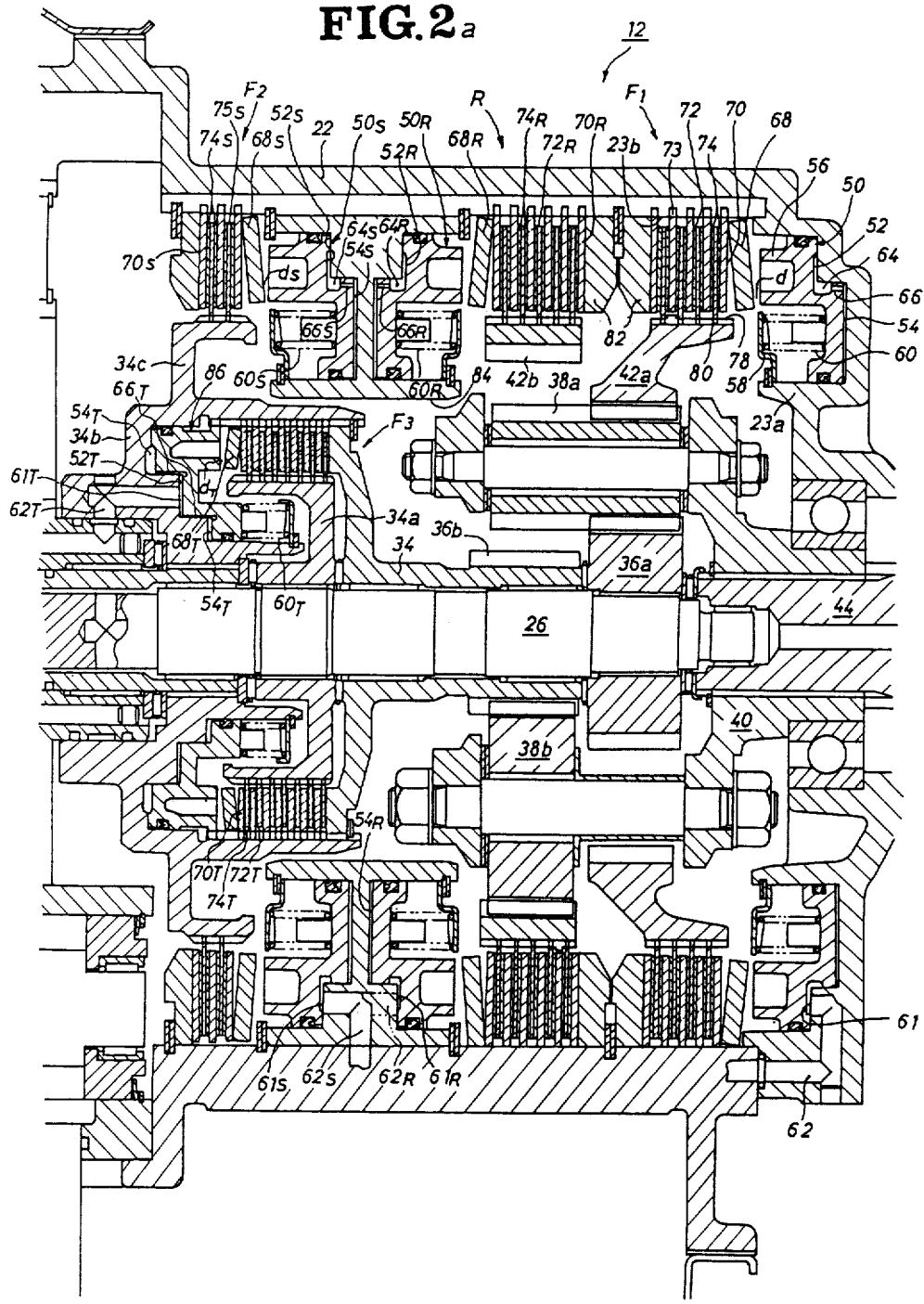
FIG. 2a is an enlarged vertical sectional view of a transmission.

Detailed constructions of the clutch F3 and the brakes F1, F2 and R will described hereunder with reference to FIG. 2a. Incidentally, components attached with the same symbols as FIG. 1 represent the same or equivalent to those of FIG. 1.

In FIG. 2a, a two-stage piston 50 for the brake F1 is installed freely slidingly in the axial direction at an rear end, i.e. a right end, of the housing 22. This two-stage piston 50 is formed into an approximately annular shape and provided with a first-stage pressed surface 52 and a second-stage pressed surface 54 concentric with each other at the right end face of the figure, and a pressing part 56 is provided projectingly at its left end face thereof. The two-stage piston 50 fits freely slidingly onto a cylinder wall 23c of the housing 22, a compression coil spring 60 supported by a retainer 58 is interposed between the cylinder wall 23a and the two-stage piston 50, and the compression coil spring 60 urges the two-stage piston 50 toward the right side of the figure.

A flow port 61 for pressure oil opens at the first-stage pressed surface 52 of the two-stage piston 50. The flow port 61 interconnects through a passage 62 to a well-known hydraulic control valve, and a supply of oil to the passage 62 is controlled by said control valve which is connected to a select lever for changing speed selectively operated by an operator in a well-known manner.

A passage 64 is formed on a part of said first-stage pressed surface 52, and this passage 64 interconnects to the second-stage pressed surface 54 through an orifice 66 which is set to a specified throttle rate. Incidentally, an area of the second pressed surface 54 is made larger than that of the first pressed surface 52 at an area ratio of two parts of the former to one part of the latter.

A coned disc spring 68 (elastic member) is installed between the two-stage piston 50 and the brake F1. The coned disc spring 68 is disposed between an outer disc 70 of the brake F1 and said presser part 56 with a specified space d left therebetween under a disengaged condition as shown in the figure. A spring constant of the coned disc spring 68 is made by far larger than that of the spring 60, and the maximum spring force of the coned disc spring 68 is preset larger than a pressing force, i.e. a hydraulic force generated only by the first-stage pressed surface 52 of the two-stage piston 50. Accordingly, under a state of the hydraulic force acting only on the first-stage pressed surface 52, the pressing force of the two-stage piston 50 does not bring the coned disc spring 68 to a fully compressed state and the coned disc spring 68 elastically intervenes between the two-stage piston 50 and the brake F1.

The brake F1 is composed of an outer disc 70, an inner disc 72 and a facing 74 etc., and the outer disc 70 has an external spline tooth 73 which spline fits freely slidingly onto an internal spline tooth 23b of the housing 22 in the axial direction. Further, the inner disc 72 has an internal spline tooth 80 which spline fits freely slidingly in an external spline 78 formed on an outer peripheral surface of the first ring gear 42a.

Facings 74 (friction material) are adhered to the opposite faces of the inner disc 72, and discs 70 and 72 are alternated so as to oppose each other. Therefore, the brake F1 is so constructed as to freely engaging and disengaging discs 70 and 72 by the hydraulic force or the pressing force transmitted from the two-stage piston 50 through the coned disc spring 68.

A retainer 82 is installed at a left end face of the brake F1 in the figure, and the retainer 82 is fixed to the housing 22 to carry the pressing force from the two-stage piston 50.

Further, clutch F3 and brakes F2 and R have the same constructions as the brake F1. Thus, the components of clutch F3 and brakes F2 and R are designated by the same reference numerals as brake F1 with subscripts T (showing the clutch added F3), S (showing the brake F2) and R (showing the brake R) thereto, respectively.

A two-stage piston 50R for the brake R and a two-stage piston 50S for the brake F2 are incorporated in an approximately annular cylinder 84R and 84S in such a way as to oppose second-stage pressed surfaces 54R and 54S each other. Further, a pressure oil is supplied from flow ports 61R and 61S (the flow port 61R at the brake R side being formed on a separate sectional position) through said control valve and passages 62R and 62S to the first-stage pressed surfaces 54R and 52S.

Moreover, the clutch F3 is so designed that it is pressed by a three-stage piston 86, a large pressed area is ensured within a narrow clutch cover 34b, and a specified pressing force can be generated.

Figure 1A:
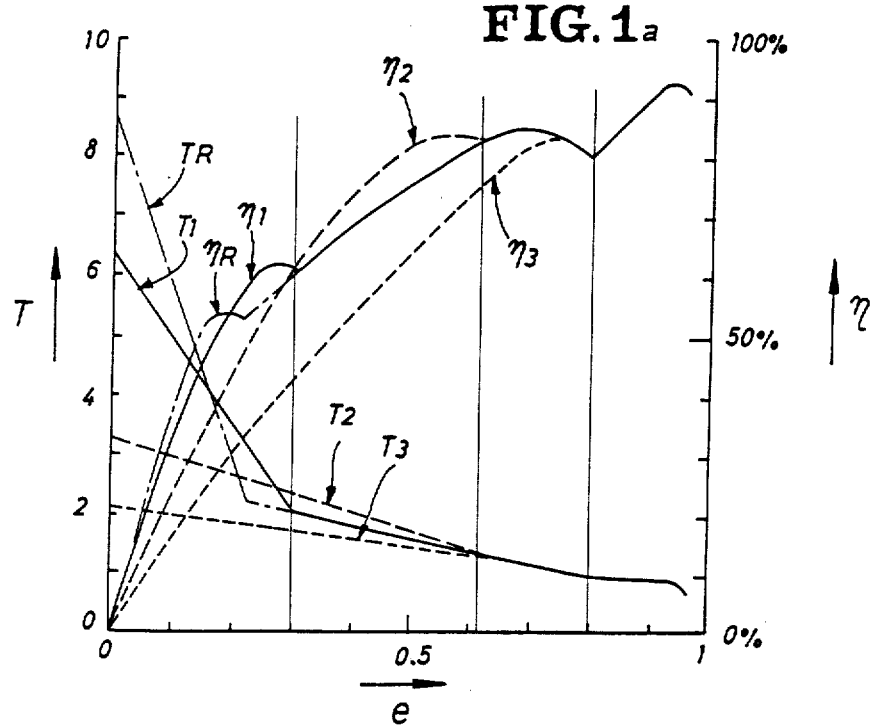
FIG. 1a is a graph showing a torque converter performance of FIG. 1.

Function will be described hereunder. In a first speed position, only the brake F1 is engaged (fixed) and the other brakes and clutch are disengaged (released). Only the first ring gear 42a is fixed to the housing 22 and the other planetary gear trains mesh and rotate integrally with each other, in this first speed position. Therefore, in a low-speed zone wherein the shifting position is automatically controlled to the first speed, the first stator 18 acts as a reversing turbine so that the power of the torque converter 10 is transmitted through both the turbine shaft 26 and the first stator shaft 30 to the transmission 12 and is combined by the both planetary gears 38a and 38b to be outputted from the planetary carrier 44. Consequently, an efficiency characteristic of the torque converter 10 at the first speed position develops a high efficiency as indicated by a characteristic $\eta1$ (solid line) in the low speed ration zone and a torque ratio characteristic T1 (solid line) also develops a high torque ratio, as shown in FIG. 1a presenting changes of a torque ratio T and an efficiency $\eta$ with respect to a speed ration e. A reduction ratio of the first speed in a practical transmission 12 is approximately 3.

Figure 1B:
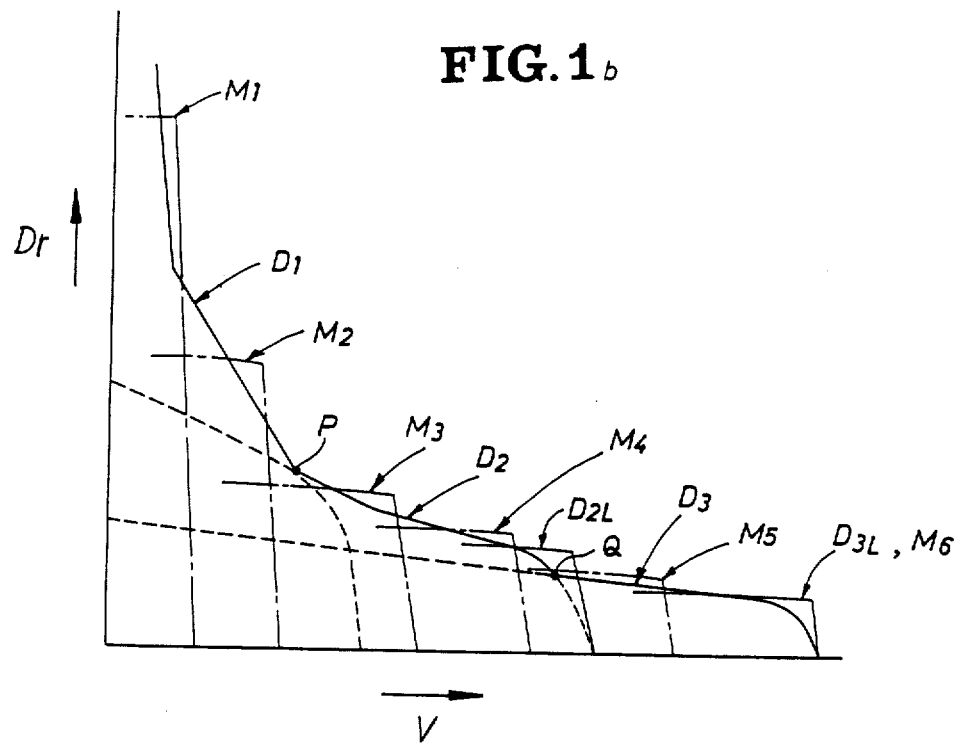
FIG. 1b is a graph showing a tractive force characteristic of FIG. 1.

When the speed ratio increases to reach a point P of FIG. 1b presenting a change of a tractive force Dr with respect to a vehicle speed V, the shifting position is changed to a second speed by means of change-over operation of the control valve.

In the second speed position, only the brake F2 is engaged and the other brakes and clutch are disengaged, so that only the first stator shaft 26 and the second sun gear 36b are fixed to the housing 22. Under this state, the first stator 18 stands still in the same manner as the second stator 20, and reaction forces of the both stators 18 and 20 are superposed through the working oil on the turbine 14 and transmitted from the turbine shaft 26 to the first sun gear 36a. Therefore, the characteristics of the torque converter 10 become as characteristics η2 and T2 developing a high efficiency and a high torque ratio in an intermediate speed ratio zone as shown in FIG. 1a. Further, the practical reduction ratio of the transmission 12 becomes approximately 1.5.

When the speed ratio further increases to reach a point Q of FIG. 1b, the shifting position is automatically changed to a third speed.

In the third speed position, only the clutch F3 is engaged and the turbine shaft 26 rotates integrally with the first stator shaft 30 in the normal direction. In this moment, the one-way clutch 32a runs idle and acts as a normal rotation turbine. Therefore, the torque converter 10 acts as a two-phase torque converter in the third speed position, and the efficiency becomes comparatively good to develop an efficiency characteristic η3 and a torque ratio characteristic T3 of FIG. 1a. Further, the practical reduction ratio of the transmission becomes 1.

When the speed ratio still further increases, the lock-up clutch 28 is engaged by means of the automatic control and the power from engine is transmitted from the turbine shaft 26 to the transmission 12 directly.

On the other hand, in a backward position wherein only the brake R of FIG. 1 is engaged, only the second ring gear 42b is fixed to the housing 22 and the other planetary gear trains rotate integrally each other. Accordingly, the power from the torque converter 10 is transmitted through both the turbine shaft 26 and the first stator shaft 30 so that the planetary carrier 40 rotates in the reverse direction. An efficiency characteristic of the torque converter in the backward position becomes ηR and a torque ratio characteristic thereof becomes TR.

The foregoing reduction ratio of each speed change stage and the reduction ratio of the first stator are shown in the following Table 1. Incidentally, 0 marks in the Table indicate engaged states of the brakes and clutch.

TABLE 1

| Shifting position | $F_1$ | $F_2$ | $F_3$ | R | Reduction ratio | Reduction ratio of 1st stator |
|---|---|---|---|---|---|---|
| Forward |  |  |  |  |  |  |
| 1st speed | O |  |  |  | $\frac{Z_{a_1} + Z_{r_1}}{Z_{a_1}} > 2$ | $-\frac{Z_{r_1} - Z_{a_2}}{Z_{a_2}}$ |
| 2nd speed |  | O |  |  | $2 > \frac{Z_{a_1} + Z_{a_2}}{Z_{a_1}} > 1$ | 0 |
| 3rd speed |  |  | O |  | 1 | 1 |
| Backward |  |  |  | O | $-\frac{Z_{r_2} - Z_{a_1}}{Z_{a_1}}$ | $-2 > -\frac{Z_{a_2} + Z_{r_2}}{Z_{a_2}}$ |

The foregoing tractive force characteristic of automatic transmission becomes as shown by FIG. 1b. Namely, it changes from a first-speed tractive force characteristic D1 to a second-speed tractive force characteristic D2, a third-speed tractive force characteristic D3 and a lock-up third-speed tractive force characteristic D3L, in turns. These characteristics develop such characteristics as approximately equivalent to tractive force characteristics M1~M6 for a conventional manual six-stage transmission, by means of three transmission stages which are smaller than those of a conventional four-stage automatic transmission. Incidentally D2L in FIG. 1b indicates a lock-up second-speed tractive force characteristic.

Functions of brakes F1, F2 and R in shifting operation will be described hereunder. When shifting the driving position from the first-speed to the second-speed for example, the brake F2 (for second-speed) is engaged while disengaging the brake F1 (for first-speed) which is under the engaged state, at a specified timing and so as not to permit a so-called speed-change shock occur.

Figure 3:
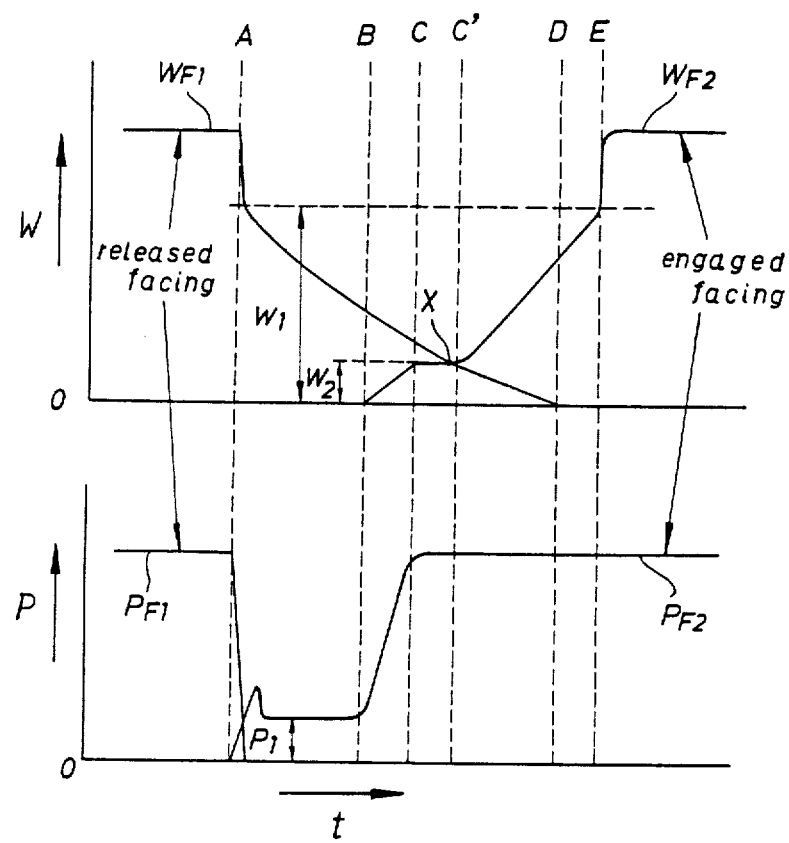
FIG. 3 presents graphs showing changes of a pressing load of friction material and a hydraulic pressure in terms of a lapse of time.
Figure 2A:
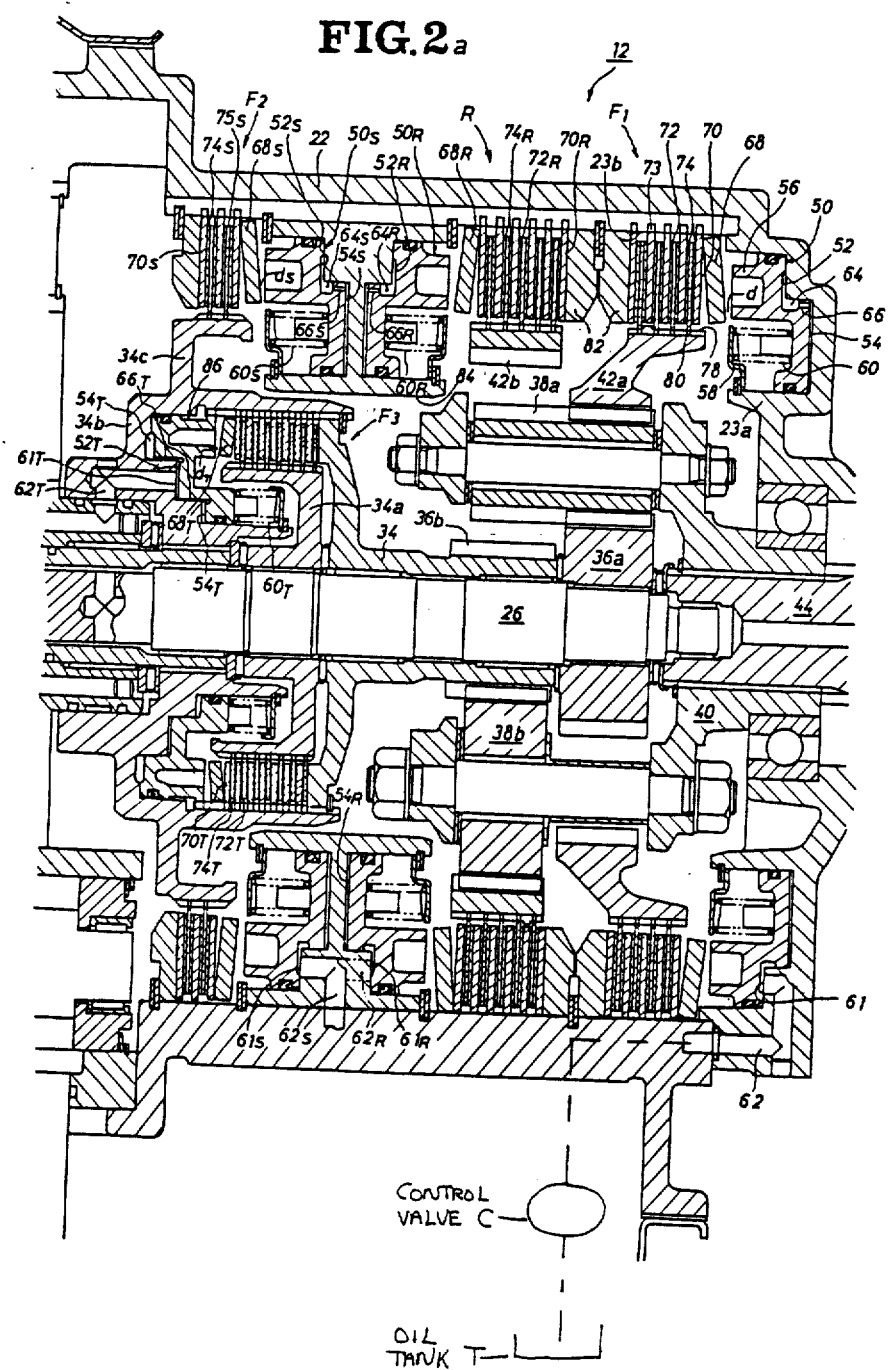

In this shift-up operation, the pressure oil is supplied to the passage 62S of the brake F2 and is discharged from the passage 62 of the brake F1 by means of the change-over operation of the control valve. The change-over operation of the control valve causes the hydraulic pressure supplied to the first-stage pressed surface 52S of the second-stage piston 50S to rise up from a control valve change-over time A, as shown by the PF2 of FIG. 3 which presents the changes of the pressing load W of friction material and the hydraulic pressure P in terms of the lapse of time T. When the pressure oil is supplied from the passage 62S to the first-stage pressed surface 52S with a pressure P1 overcoming a spring force of the spring 60S, the second-stage piston 50S slides within a stroke range of distance ds. The brake F2 is kept at the disengaged state in this stroke range, i.e. an interval A–B (FIG. 3).

On the other hand, the hydraulic pressure supplied to the passage of the two-stage piston 50 drops abruptly from the change-over time A as shown by the characteristic PF1, and the pressure oil supplied to the passage of the two-stage piston 50 is discharged.

The above discharge of oil causes the pressing load of the brake F1 to abruptly decrease from the time A as shown by a characteristic WF1 of FIG. 3, a return speed of the two-stage piston is slowed down from a speed corresponding to the maximum spring force W1 of the coned disc spring 68 by the throttling function of the orifice 66, and the characteristic WF1 becomes zero at a time D.

Further, the brake F2 begins to receive the pressing force from the two-stage piston 50 through the coned disc spring 68S at a time B. Under this state, the pressure oil supplied from the flow port 61S flows only to the first-stage pressed surface owing to the throttling function of the orifice 66S so that the pressing load on the brake F2 increases comparatively slowly within an interval B–C as shown by the characteristic WF2.

When the hydraulic force acting on the first-stage pressed surface 52S reaches a load W2 at a time C, the pressure oil begins to flow from the orifice 66S to the second-stage pressed surface 54S. The pressure oil flows to the second-stage pressed surface 52S but the two-stage piston 50S does not make a stroke in an internal C–C', and the pressing load on the brake F2 maintains the load W2 as shown by the characteristic WF2.

The both characteristics WF1 and WF2 intersect at a point X in this interval C–C', and a torque transmission value of the brake F1 becomes equal with that of the brake F2 at this point X. An engine torque transmitted to the brake F2 becomes large and a share of torque transmission to the brake F1 becomes small in an area beyond this point X.

The foregoing change-over between the brakes F1 and F2 is done at the point X within the interval C–C', wherein the characteristic WF2 maintains the load W2. Therefore, the so-called speed-change shock peculiar to the conventional automatic transmission does not occur even when a major torque transmission medium changes from the brake F1 to the brake F2, so that the speed-change feeling can be improved and a smooth shift-up operation becomes obtainable. Incidentally, the torque converter operates approximately in the same way also in the shift-down operation.

In the area beyond the point X, the hydraulic pressure of characteristic PF2 acts on the both pressed surfaces 52S and 54S of the two-stage piston 50S, the pressing load on the brake F2 is kept increased by the two-stage piston 50S through the coned disc spring 68S within an interval C'–E as shown by the characteristic WF2. Then, the coned disc spring 68S becomes fully compressed at a time E and the brake F2 is completely engaged or fixed.

The foregoing speed-change operations of the brakes F1, F2 and R, i.e. operations of disengaged brake friction material and engaged brake friction material are summarized as follows.

For the disengaged friction material, the hitherto supplied hydraulic pressure is discharged at the point A by the change-over operation of valve and suddenly drops to zero. However, since the coned disc spring is in close contact with the piston and the friction material therebetween, the load pressing the friction material falls down to the load produced when the coned disc spring is in close contact. The piston is thereafter apt to be returned by the coned disc spring and the piston return spring, but oil is filled in pistons other than the first-stage piston and this oil produces a flow resistence because it can be discharged only through the orifice. At first the piston moves quickly when the load of coned disc spring is large, but the piston is returned slowly because the load of coned disc spring is decreased as the piston returns. The load of coned disc spring becomes naught at the point D, but the piston is further returned by the piston return spring. Consequently, a piston resistance produced when the piston is returned by the coned disc spring in an interval A–D of FIG. 3, becomes a load received by the friction material and becomes a locus of the characteristic WF1.

For the engaged friction material, on the other hand, the pressure oil is supplied to the first-stage pressed surface of piston at the point A by the change-over operation of valve. The supplied oil pushes forth the piston toward the friction material against the load of piston return spring. In this instance, only a little quantity of oil is supplied to pressed surfaces other than the first-stage surface due to the orifice. The piston can move within a short time because the first-stage pressed surface can move only with a little quantity of oil and further the piston can be moved by a totally little quantity of oil at this stage. When the piston reaches the point B in the next stage, the hydraulic pressure pressing the first-stage pressed surface rises up to the point C within a short time because the piston receives a load from the coned disc spring and loses its movement speed. However, since the hydraulic pressure acts only on the first-stage pressed surface, the pressing force on piston is still small and the coned disc spring deforms by a specified distance. Further, the oil supplied to the first-stage pressed surface is led to other pressed surfaces through the orifice to be filled thereto at the point C', thus its hydraulic pressure rises. The piston stops moving during this time required for filling oil so that a constant load is applied on the friction material. The coned disc spring deforms and the piston moves toward the friction material as the pressure on the piston pressed surface increases, however, oil can not be supplied quickly from the first-stage piston due to the orifice. Accordingly, the piston moves slowly and therefore the load pressing the friction material rises up gradually. Then, the hydraulic pressure rises up sharply because the coned disc spring becomes in close contact and the piston does not move anymore when it reaches the point E. Accordingly, the load received by the friction material becomes as a locus of the characteristic WF2 within the interval B–E of FIG. 3. Especially in this interval B–E, friction material transmission torques of engaged and disengaged sides, which are proportional to the load, overlap each other. The speed-change feeling can be improved because the above engagement and disengagement are effected gradually for both the engaged side and the disengaged side.

Effect of the Invention

As described above, in the automatic transmission providing the planetary gear transmission which carries out the change-over operation of drive stage of plural planetary gear elements by properly and hydraulically engaging or disengaging plural friction elements in the friction brake or friction clutch with or from the rear stage of the torque converter transmitting the engine power by means of fluid; the drive stage control mechanism for automatic transmission according to the present invention is so constructed that the piston carrying out the engagement or disengagement of said friction brake or friction clutch by means of hydraulic force is provided, the pressed surface of this piston is formed into plural concentric stepped surfaces, the pressure oil passage port interconnecting with the control valve controlling charge and discharge of hydraulic pressure is provided at any one stage of said plural stepped surfaces, the passage leading the hydraulic pressure from this any one stage to another stage and having the throttling function is provided, and the elastic member effecting the pressure force on the friction element when engaging the friction element is provided between said piston and the friction element. Therefore, the following advantageous effects become obtainable.

In case for example when shifting the drive position from the first-speed to the second-speed, i.e. when the brake F1 is disengaged and the brake F2 is engaged; the pressing load on the facing 74S of the engaged brake F2 becomes as shown by the characteristic WF2 of FIG. 3, while the pressed load on the facing 74 of the disengaged brake F1 changes as indicated by the characteristic WF1. Thus, it is possible to make the characteristic WF1 intersect the characteristic WF2 when the characteristic WF2 maintains the constant load W2 in the interval C-C'. Accordingly, the point X at which the brake F1 is switched to the brake F2 occurs in the interval C-C', and the speed-change shock in shift-up operation can be moderated considerably. Further, the speed-change shock peculiar to the conventional automatic transmission is solved by installing the coned disc spring 68 and the two-stage piston 50 having the both pressed surfaces 52 and 54 and the orifice 60 formed therein, so that the drive feeling in shift-up operation can be improved.

Moreover, the speed-change shock in shift-down operation can be eliminated in the same way.

Figure 4:
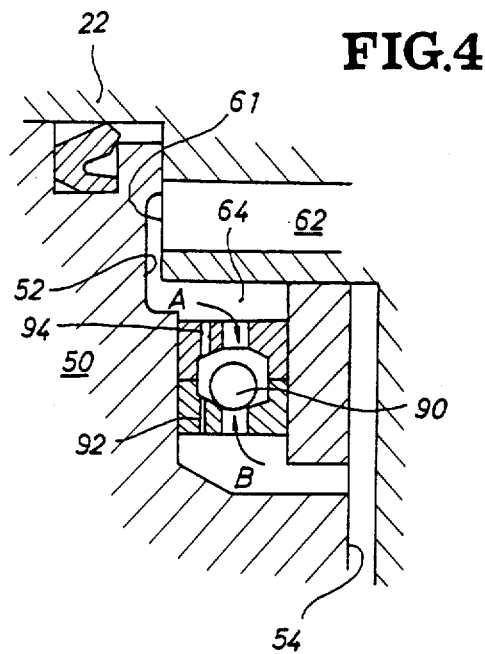
FIG. 4 is a principal vertical sectional view showing another embodiment.

Another Embodiment (1) The first-stage piston may be interconnected with the other stage pistons through the fixed orifice as described above. However, in case when the fixed orifice is used, the engaging characteristic will also restricts the disengaging characteristic. Therefore, such a construction as FIG. 4 may be employed, wherein the orifice is made variable according to the direction of oil flow.

Namely, a ball valve 90 is interposed in way of the passage 64, and a feed-side thin orifice 92 and a return-side thick orifice 94 are formed; thereby a throttle rate of pressure oil from the first-stage pressed surface 52 to the second-stage pressed surface 54 as shown by an arrow A is set large and a throttle rate of pressure oil in the reverse direction as shown by an arrow B is set small.

(2) The drive stage control mechanism according to the present invention may be employed only in any one of brakes F1, F2 and R and clutch F3 is stead of being employed in all the brakes and clutch.

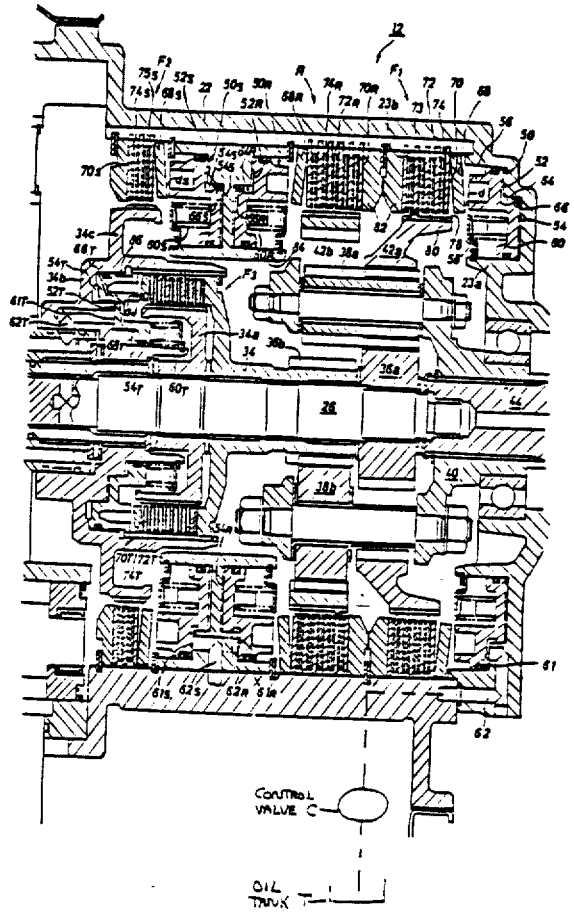

What is claimed is:

1. In an automatic transmission providing a planetary gear transmission which carries out a change-over operation of drive stage of plural planetary gear elements by hydraulically engaging and disengaging plural friction elements from a rear stage of a torque converter transmitting an engine power by means of fluid; a drive stage control mechanism for automatic transmission, in which a piston for engagement and disengagement of said friction elements by means of hydraulic force is provided, a pressed surfaces of said piston is formed into plural concentric stepped surfaces, a pressure oil passage port interconnecting with a control valve controlling charge and discharge of hydraulic pressure is provided at any one stage of said plural stepped surfaces, a passage having an orifice and leading the hydraulic pressure from said any one stage to another stage and having a throttling function is provided, and an elastic member effecting a pressure force on a friction element when engaging the friction element is provided between said piston and said friction element, said elastic member have a maximum spring force set larger than a hydraulic pressing load acting on a pressed surface at any stage of said piston to which said hydraulic pressure is first applied.

2. A drive stage control mechanism for automatic transmission as set forth in claim 1, in which said automatic transmission includes a four element two stage torque converter having a turbine shaft and a stator shaft and a piston for exerting a hydraulic force on a clutch provided between said turbine shaft and said stator shaft has concentric three-stage pressed surfaces and transmits a large hydraulic force to the friction material of said clutch between said turbine shaft and said stator shaft.

3. In an automatic transmission providing a planetary gear transmission which carries out a change-over operation of drive stage of plural planetary gear elements by hydraulically engaging and disengaging plural friction elements from a rear stage of a torque converter transmitting an engine power by means of fluid; a drive stage control mechanism for automatic transmission, in which a piston for engagement and disengagement of said friction elements by means of hydraulic force is provided, a pressed surfaces of said piston is formed into plural concentric stepped surfaces, a pressure oil passage port interconnecting with a control valve controlling charge and discharge of hydraulic pressure is provided at any one stage of said plural stepped surfaces, a passage having an orifice and leading the hydraulic pressure from said any one stage to another stage and having a throttling function is provided, and an elastic member effecting a pressure force on a friction element when engaging the friction element is provided between said piston and said friction element, said piston includes concentric first-stage pressed surface and second-stage pressed surface, an area of the second-stage pressed surface is set larger than that of the first-stage pressed surface, a passage having an orifice is provided between the both pressed surfaces, a piston pressing load characteristic acting on an engaged material is set to include an intersecting interval producing a constant pressing load while a hydraulic force is exerted from the first-stage pressed surface to the second-stage pressed surface, and a piston pressing load characteristic acting on a disengaged friction material is set to intersect the engaged side pressing load characteristic within the intersecting interval of said engaging side pressing load characteristic.

4. In an automatic transmission providing a planetary gear transmission which carries out a change-over operation of drive stage of plural planetary gear elements by properly and hydraulically engaging and disengaging plural friction elements from a rear stage of a torque converter transmitting an engine power by means of fluid; a drive stage control mechanism for automatic transmission, in which a piston carrying out the engagement and disengagement of said friction elements by means of hydraulic force is provided, a pressed surface of said piston is formed into plural concentric stepped surfaces a pressure oil passage port interconnecting with a control valve controlling charge and discharge of hydraulic pressure is provided at any one stage of said plural stepped surfaces, a passage leading the hydraulic pressure from said any one stage to another stage and having a throttling function is provided, an elastic member effecting a pressure force on a friction element when engaging the friction element is provided between said piston and said friction element, said piston includes concentric first-stage pressed surface and second-stage pressed surface, an area of the second-stage pressed surface is set larger than that of the first-stage pressed surface, a passage having an orifice is provided between said first and second pressed surfaces, a piston pressing load characteristic acting on an engaged friction material is so set as to include an intersecting interval producing a constant pressing load while a hydraulic force is exerted from said first-stage pressed surface to the second-stage pressed surface, a piston pressing load characteristic acting on a disengaged friction material is set to intersect the engaged side pressing load characteristic within the intersecting interval of said engaging said pressing load characteristic, and the maximum spring force of said elastic member is set larger than said hydraulic pressing load acting on said pressed surface at any state of said piston to which said hydraulic pressure is first applied.

* * * * *

UNITED STATES PATENT AND TRADEMARK OFFICE
CERTIFICATE OF CORRECTION

PATENT NO. : 4,713,984

DATED : December 22, 1987

INVENTOR(S) : Masahiro Ohkubo

It is certified that error appears in the above-identified patent and that said Letters Patent is hereby corrected as shown below:

The title page showing the illustrative figure should be deleted to appear as per attached title page.

On the drawing sheet 3 of 4, delete figure 2a and insert new figure 2a, as shown on the attached page.

Signed and Sealed this

Fifth Day of July, 1988

Attest:

DONALD J. QUIGG

Attesting Officer

Commissioner of Patents and Trademarks

United States Patent [19]
Ohkubo

[11] Patent Number: 4,713,984
[45] Date of Patent: Dec. 22, 1987

[54] DRIVE STAGE CONTROL MECHANISM FOR AUTOMATIC TRANSMISSION

[75] Inventor: Masahiro Ohkubo, Kadoma, Japan

[73] Assignee: Kabushiki Kaisha Daikin Seisakusho, Osaka, Japan

[21] Appl. No.: 881,297

[22] Filed: Jul. 2, 1986

[30] Foreign Application Priority Data

Jul. 8, 1985 [JP] Japan .................... 60-150828

[51] Int. Cl.⁴ ............................................. F16H 47/00
[52] U.S. Cl. ............................. 74/732; 74/740; 74/752 C; 192/85 AA; 192/109 F
[58] Field of Search ............ 74/360, 867, 868, 331, 74/869, 731, 861, 732, 752 C, 740; 188/347, 348; 192/52, 109 F, 85 AA

[56] References Cited

U.S. PATENT DOCUMENTS

| | | | |
|---|---|---|---|
| 3,126,752 | 3/1964 | Bolster | 74/359 |
| 3,282,385 | 11/1966 | Snyder | 192/109 F |
| 3,378,111 | 4/1968 | Greer et al. | 192/109 F |
| 3,633,439 | 1/1972 | Annis | 74/869 X |
| 3,650,364 | 3/1972 | Laing | 192/85 AA |
| 4,144,955 | 3/1979 | Garnier | 192/109 F |

FOREIGN PATENT DOCUMENTS

39-5562 12/1964 Japan.

Primary Examiner—George H. Krizmanich
Attorney, Agent, or Firm—Armstrong, Nikaido, Marmelstein & Kubovcik

[57] ABSTRACT

In an automatic transmission having a four-element two-stage torque converter and a planetary gear transmission which carries out a change-over operation of drive stage of plural planetary gear elements by hydraulically engaging and disengaging plural friction elements from the rear stage of the torque converter transmitting engine power by means of fluid; a drive stage control mechanism for automatic transmission, in which a piston carrying out the engagement and disengagement of the friction members by means of hydraulic force. The pressure surface of the piston is formed into plural concentric stepped surfaces. A pressure oil passage port interconnecting with a control valve for controlling charge and discharge of hydraulic pressure is provided at any one stage of the plural stepped surfaces. A passage leading the hydraulic pressure from such any one stage to another stage and having a throttling function is provided. An elastic member effecting a pressure force on a friction element when engaging the friction element is provided between the piston and the friction element.

4 Claims, 7 Drawing Figures